US007821874B2

(12) United States Patent
Liu et al.

(10) Patent No.: US 7,821,874 B2
(45) Date of Patent: Oct. 26, 2010

(54) SYSTEMS, METHODS AND COMPUTER PRODUCTS FOR MULTIPLE REMINDER AND SUB-EVENTS FOR CALENDAR ITEMS

(75) Inventors: Jerry Liu, Atlanta, GA (US); Darryl Moore, Social Circle, GA (US); Steven Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 384 days.

(21) Appl. No.: 11/965,609

(22) Filed: Dec. 27, 2007

(65) Prior Publication Data

US 2009/0168607 A1 Jul. 2, 2009

(51) Int. Cl.
G04B 47/00 (2006.01)
G04C 17/00 (2006.01)
G04C 21/00 (2006.01)

(52) U.S. Cl. .............................. 368/10; 368/29; 368/73; 705/8

(58) Field of Classification Search ................... 368/10, 368/21, 41, 28, 29, 72–74, 248, 250, 251, 368/261, 262; 705/8, 9; 709/205–207
See application file for complete search history.

(56) References Cited

U.S. PATENT DOCUMENTS

| | | | | |
|---|---|---|---|---|
| 4,104,865 A * | 8/1978 | Sasaki | ............................ | 368/28 |
| 4,630,934 A * | 12/1986 | Arber | ............................ | 368/28 |
| 4,681,465 A * | 7/1987 | Nakamura et al. | ............ | 368/246 |
| 4,708,490 A * | 11/1987 | Arber | ............................ | 368/28 |
| 4,868,800 A * | 9/1989 | Arber | ............................ | 368/29 |
| 5,602,963 A * | 2/1997 | Bissonnette et al. | .......... | 704/275 |
| 7,480,212 B1 * | 1/2009 | DuBreuil | ...................... | 368/30 |
| 7,640,507 B2 * | 12/2009 | Bedingfield, Sr. | ............ | 715/752 |
| 2003/0002390 A1 * | 1/2003 | Sellen et al. | .................... | 368/12 |
| 2005/0141677 A1 * | 6/2005 | Hyttinen et al. | ................ | 379/50 |
| 2006/0217967 A1 * | 9/2006 | Goertzen et al. | ............. | 704/201 |

* cited by examiner

*Primary Examiner*—Vit W Miska
(74) *Attorney, Agent, or Firm*—Cantor Colburn LLP

(57) ABSTRACT

Systems, methods and computer program products for multiple reminder and sub-events for calendar items. Exemplary embodiments include a method including creating an event having an event time in the electronic calendar, creating a first reminder associated with the event and configured to activate at a first time prior to the event and creating another reminder associated with the event and configured to activate at a second time prior to the event and after the first time. Additional exemplary embodiments include a method including identifying deadlines associated with the sub-events, setting a reminder for each of the deadlines associated with the sub-events, setting a sound attribute for each of the reminders, and activating the reminder for each of the deadlines associated with the sub-events. An activation two reminders having a common deadline can have a unique sound attribute.

20 Claims, 7 Drawing Sheets

SYSTEMS, METHODS AND COMPUTER PRODUCTS FOR MULTIPLE REMINDER AND SUB-EVENTS FOR CALENDAR ITEMS

BACKGROUND

Exemplary embodiments relate generally to electronic calendar reminders and alerts, and more particularly, to systems, methods and computer program products for multiple reminder and sub-events for calendar items.

Improvements to computer processing power and computer operating systems (e.g., MICROSOFT WINDOWS) have led to the capability of personal computer users being able to keep more than one application program open at the same time. With the advent of high-speed Internet service, one of the applications that many persons find helpful to continue running while busy at other tasks on their desktops is their calendar application program. When a calendar and/or task event ("event") becomes "due" or active, a "ping" tone can be heard, which alerts the user that the event has become "due" or active. Alternatively, several applications offer "pop-up" windows when an event or task becomes due. Regardless of the manner in which the event or task alerts the user, only a single reminder is offered in current calendar applications. The present technology does not allow for multiple reminders to be created for a single task or event, such as a calendar event.

BRIEF SUMMARY

Exemplary embodiments include a method for generating multiple reminders in an electronic calendar, the method including creating an event having an event time in the electronic calendar, creating a first reminder associated with the event and configured to activate at a first time prior to the event and creating another reminder associated with the event and configured to activate at a second time prior to the event and after the first time.

Additional exemplary embodiments include a method for generating multiple reminders for an event having sub-events, the method including identifying deadlines associated with the sub-events, setting a reminder for each of the deadlines associated with the sub-events, setting a sound attribute for each of the reminders, and activating the reminder for each of the deadlines associated with the sub-events. An activation of two reminders having a common deadline includes a sound attribute different from any one of the sound attributes for each of the reminders for each of the deadlines associated with the sub-events.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

Figure 1:
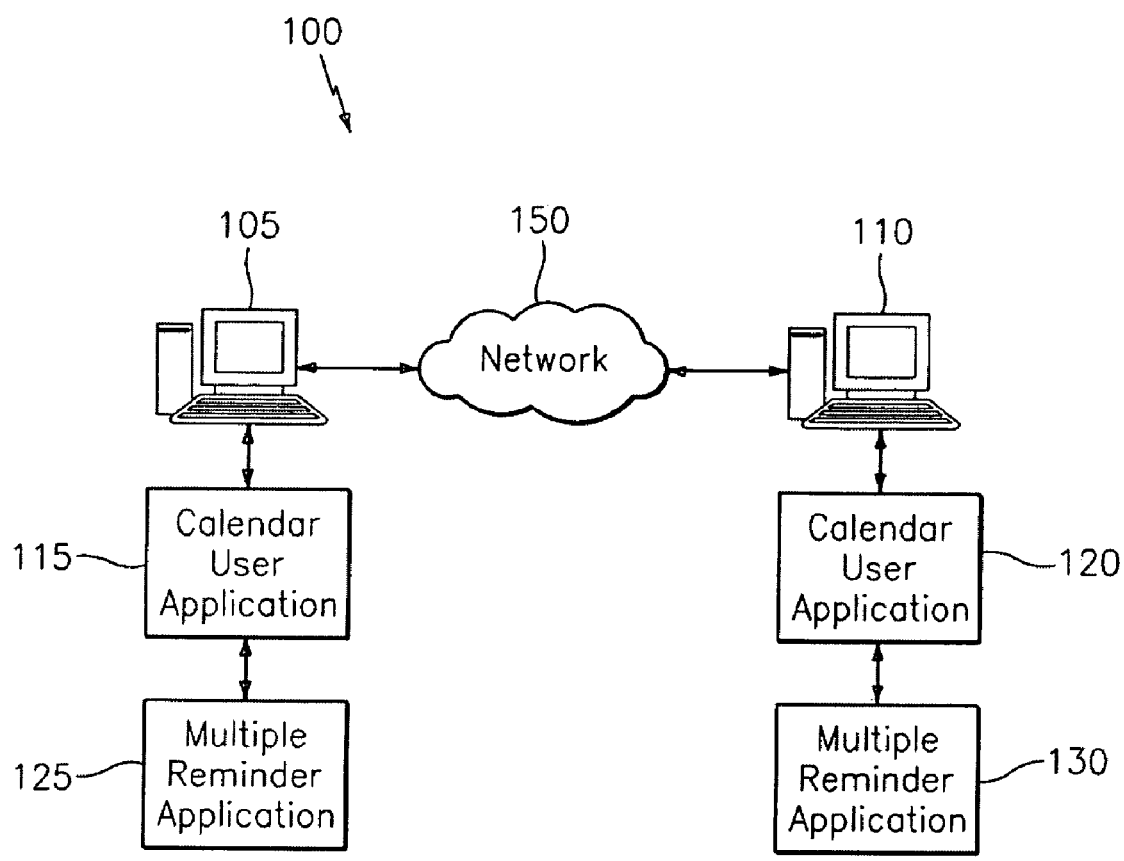
FIG. 1 is a schematic diagram of one implementation of a computer network system in exemplary embodiments.

The detailed description explains the exemplary embodiments, together with advantages and features, by way of example with reference to the drawings.

DETAILED DESCRIPTION OF EXEMPLARY EMBODIMENTS

Exemplary embodiments include systems, methods, and computer program products for providing multiple reminders for events and/or tasks in calendar applications. In exemplary embodiments, regardless of whether an item is an event, such as a calendar event, or a task, a computer executing the software application displays to the user a way to add another reminder for the item. For example, a selectable button appears in the event/task dialog box that the user can click on to add another reminder. The user can then fill in the parameters of that reminder. The parameters can be similar to well-known parameters for reminders.

The exemplary embodiments described herein generally refer to a user in the context of a sole user applying multiple reminder settings to his/her computer. However, it is appreciated that the user can also be in the context of a sender and/or recipient sending and receiving multiple reminders from other computers. As such, a user can generate user-designated calendar-driven reminder presentations so that the user can set the reminders to generate based on calendar-linked notifications for appointment reminder, task due dates, etc. The user can also be a recipient, as mentioned, in which a sender, such as a meeting organizer, designates the alerts. The end user can exert control over the notifications including whether to accept or override sender calendar-linked notifications and designations, override them to not generate at all, retain the user's designations, etc. Furthermore, an administrator can manage user privileges in which rules can be made determining, among other things, who can override, who can override who and for which event types, etc. It is appreciated that in other exemplary embodiments, a user can also be in the context of a sender's recipient. As such, the systems and methods described herein can be implemented to generate multiple reminders for multiple users based on electronic messages sent between users.

In general, the term "electronic message" refers to any user or sender-generated activity that results in a calendar- or task-related event alert being generated on the end user's view. Examples include, but are not limited to: meeting or appointment reminders; task status reminders; due date reminders; overdue alerts, etc. It is appreciated that the systems and methods described herein disclose a computer as the device that includes the calendar applications. It is appreciated that computers are described for illustrative purposes and that any type of network-enabled device capable of implementing calendar applications where any calendar/task event alerts can be propagated is contemplated. It is further contemplated that the devices can share and be synced with a common calendar and are capable of playing the alert. In exemplary embodiments, the device can be a personal computer, a laptop computer, a portable computing device (e.g., personal digital assistant), a cellular telephone, etc.

Exemplary embodiments are now described in more detail with reference to the figures. FIG. 1 is a schematic diagram of a computer network system 100 in exemplary embodiments. According to an exemplary embodiment, the system 100 includes at least one computer terminal 105 connected through a communications network 150 to another computer terminal 110. Each computer terminal 105, 110 may have a software operating system that runs a number of application programs. The software, including the operating system and the application programs, are stored in the memories of the terminals 105, 110. The memory can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory may incorporate electronic, magnetic, optical, and/or other types of storage media. Note that the memory can have a distributed architecture, where various components are situated remote from one another, but can be accessed by the processor.

Application programs may be provided for word processing, audio and video editing, spread sheets, graphics, and multimedia presentations, etc. A user controls the computer terminals 105, 110 through a user interface, such as a graphic interface, which he communicates with via a keyboard, mouse or other input device. The term "computer terminal" in this description is not limited to any specific type of terminal and may include computer systems having many computers, or only a portion of a computer (e.g., thin client), and the associated peripheral devices as are necessary for the operation of the invention. Further, the computer terminals may represent any device that is capable of sending and/or receiving an event, such as a PDA, wireless phone, wireless event device, etc.

The multiple calendar reminder methods described herein may be in the form of a source program, executable program (object code), script, or any other entity including a set of instructions to be performed. When implemented as a source program, then the program needs to be translated via a compiler, assembler, interpreter, or the like, which may or may not be included within the memory, so as to operate properly in connection with the respective operating system. Furthermore, the multiple calendar reminder methods can be written as an object oriented programming language, which has classes of data and methods, or a procedure programming language, which has routines, subroutines, and/or functions.

The network 150 may be in the form of a wired network or a wireless network. The network 150 may be a simple, single communications path, or it may include one or several LANs or WANs, the World Wide Web, or any combination thereof. In exemplary embodiments, the network 150 can be a managed IP network administered by a service provider. The network 150 can also be implemented in a wireless fashion, e.g., using wireless protocols and technologies, such as Wi-Fi, Wi-Max, etc. The network 150 can also be a cellular communications network, a fixed wireless network, a wireless local area network (LAN), a wireless wide area network (WAN), a personal area network (PAN), intranet, metropolitan area network, Internet network, or other similar type of network environment or other suitable network system and includes equipment for receiving and transmitting signals. In other exemplary embodiments, the network 150 can be a circuit-switched network such as a standard public switched telephone network (PSTN). The computer terminals 105, 110 may be the only two terminals connected to the network 150, or alternatively, the network may be shared by many other terminals.

As discussed above, exemplary embodiments are described herein with reference to associating multiple reminders with an application capable of generating events and tasks as well as related reminders. For example, a calendar application that is capable of generating events and tasks and reminders related to those events and tasks can generate multiple reminders associated with the reminders of those events and tasks. It is understood that the multiple reminders may be associated with other types of electronic messages, such as text messaging. Thus, embodiments are not limited to the aforementioned applications, but rather are applicable to electronic messaging in general. It is also understood that such applications can not only be shared applications as described herein, but also for single user use, in which, for example, a calendar can generate multiple reminders concurrently for the non-networked user.

One of the applications programs the user of computer terminal 105 may call for execution by the operating system is a calendar application program 115. The calendar application program 115 allows the user to generally schedule events either for personal non-networked use, but also for networked use, such as a shared calendar for a group. Such a shared calendar can be distributed over the network 150 to the other computer terminal 110. The calendar application program 115 also receives and displays on the display of terminal 105 shared calendar events and tasks received from the terminal 110. Similarly, the computer terminal 110 has a calendar application program 120 that is capable of allowing a user to generally schedule events either for personal non-networked use, but also for networked use, such as a shared calendar for a group to terminal 105 and to receive and display similar messages from terminal 105. One existing implementation of the application programs 115, 120 is a program sold under the trademark OUTLOOK by the MICROSOFT CORPORATION of Bellview, Wash. As is evident, there are many other suitable commercially available calendar application programs which could be used. It is generally appreciated that the calendar applications 115, 120 described are capable not only of generating schedules, events, tasks and the like, but also reminders associated with those schedules, events, tasks, and the like. Therefore, the aforementioned terms are used together and interchangeably herein.

Working in concert with each calendar application program 115, 120 is a corresponding multiple reminder application program 125, 130, respectively. According to an exemplary embodiment, the multiple reminder application program 125 supports a process for associating multiple reminders by a sender with schedules the user has generated with the calendar application program 115 and further provides for receiving schedules and generating multiple reminders sent from the computer terminal 110. The multiple reminder application program 130 supports a process for associating announcement files by a sender with schedules that the user has generated on the calendar application program 120 and further provides for receiving calendar information and playing announcement files sent from the terminal 105. As fully explained herein, the multiple reminder application programs 125, 130 may be integrated into the calendar application programs 115, 120 or may be separate programs enhancing the functionality of the calendar communications.

As part of the calendar application program 115 and as part of the terminal 105, there is a communications interface connected to the network 150 that permits the calendar application program 115 to send and receive communications over the network 150. Similarly, as part of the calendar application program 120 and as part of the terminal 110, there is a communications interface connected to the network 150 that permits the calendar application program 120 to send and receive communications over the network 150. For the purposes of this specification, the convention is used that a sender of an event is a user of either the terminal 105, terminal 110, or other similar terminal, who composes and sends an electronic communication over the network 150 with or without multiple reminders, and a recipient is a user of either the terminal 105, terminal 110, or other similar terminal, who receives and displays an electronic communication with or without multiple reminders from the network 150.

Figure 2:
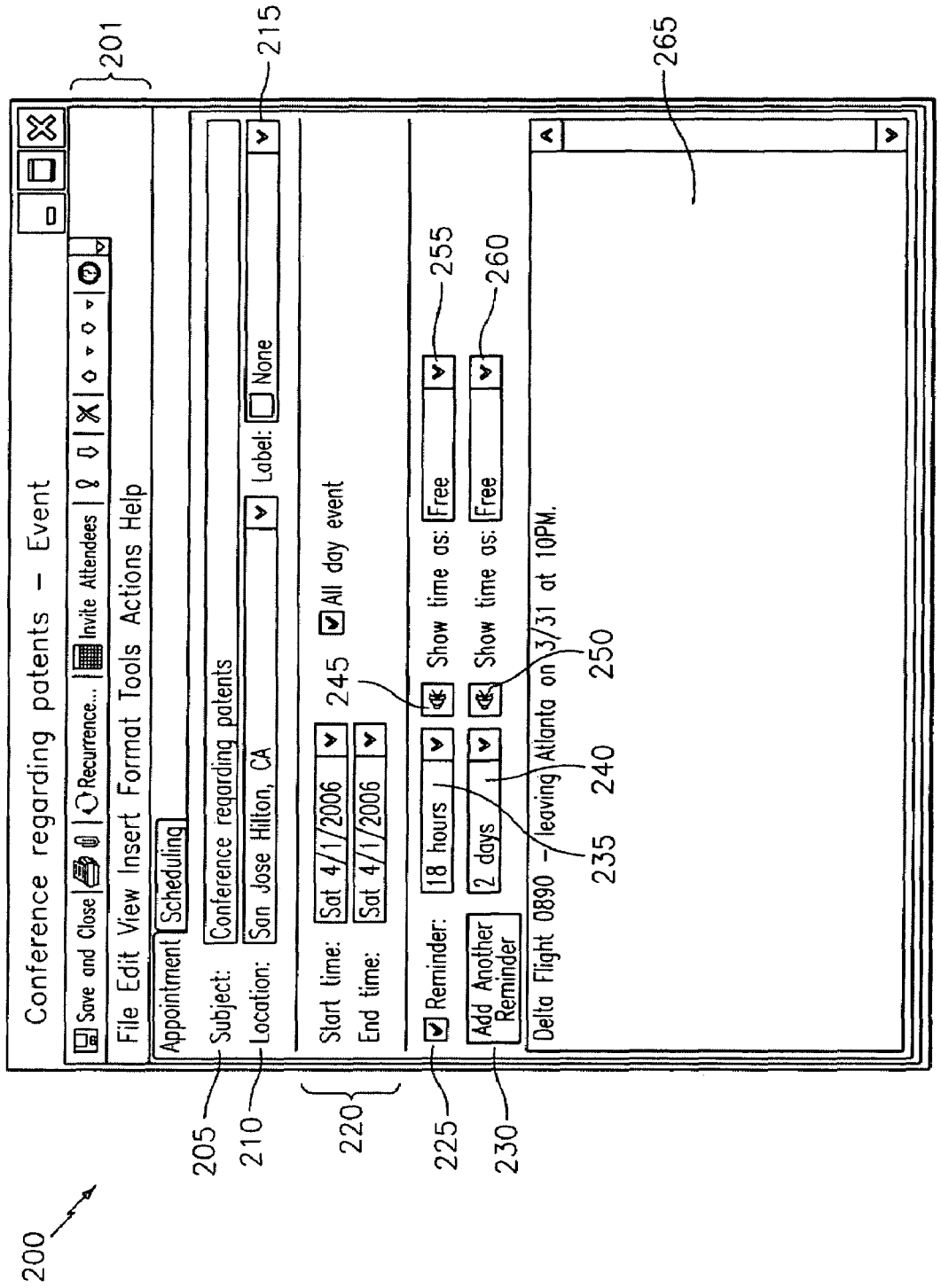
FIG. 2 illustrates a screenshot of a multiple reminder appointment scheduling user interface in accordance with exemplary embodiments.
Figure 3:
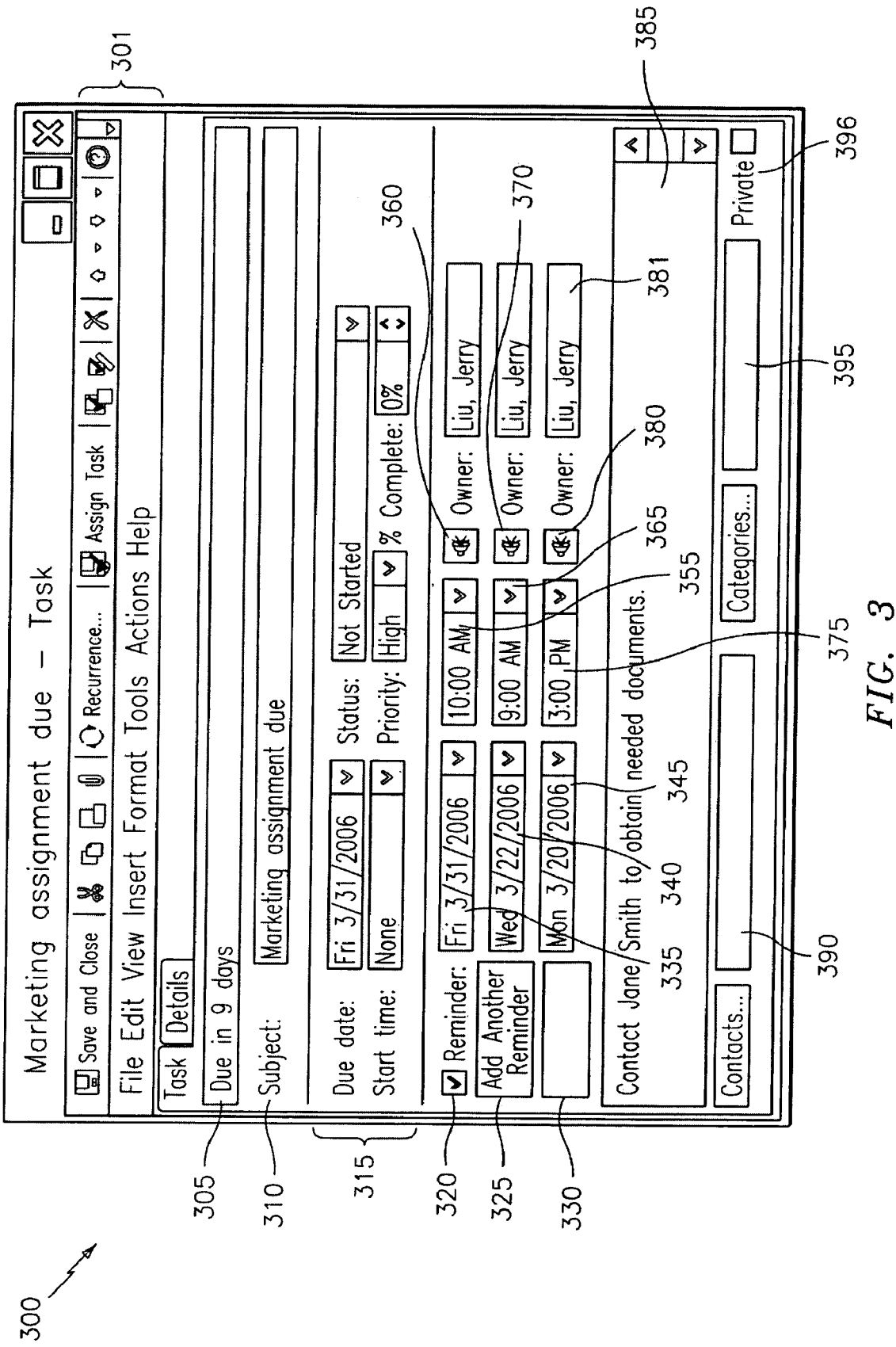
FIGS. 3 and 4 illustrate screenshots of multiple reminder task user interfaces in accordance with exemplary embodiments.
Figure 4:
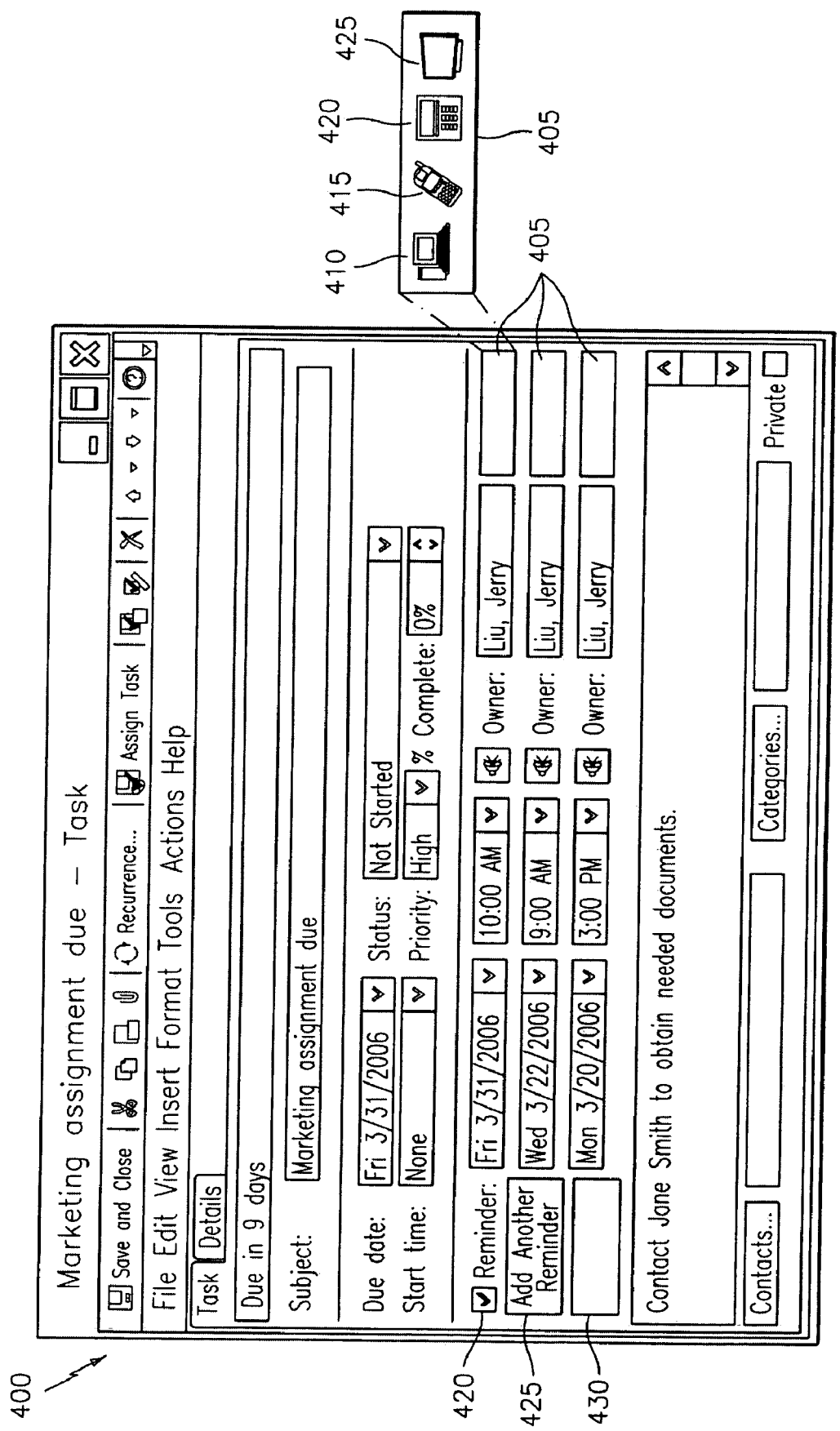

With respect to exemplary embodiments, regardless of whether the item is an event, such as a calendar event, or a task, a computer, such as the terminal 105, 110, executing the software application, such as the multiple reminder application 125, 130, displays to the user a way to add another reminder. FIG. 2 illustrates a screenshot of a multiple reminder appointment scheduling user interface 200 in accordance with exemplary embodiments. FIGS. 3 and 4 illustrate a screenshot of multiple reminder task user interfaces 300 and 400 in accordance with exemplary embodiments. In each of these figures, a selectable button appears in the event/task dialog box that the user can click on to add another reminder as further described herein. The user can then fill in the parameters of that reminder; the parameters can be similar to well-known parameters for reminders.

Referring again to FIG. 2, the interface 200 can include a subject data field 205, a location data field 210 and a label data field 215. In exemplary embodiments, the interface 200 can further include conventional pull down menus 201. For example, the conventional pull down menus 201 can include an invite attendees option. In exemplary embodiments, the invite attendees option can include options to generate multiple reminders as discussed herein. In exemplary embodiments, the interface 200 can further include time options 220, including a start time and end time data fields and an indicator whether or not the appointment is an all-day event.

In exemplary embodiments, the interface 200 can further include a reminder data field 225 such as a check box including a time data field 235, an audible reminder option 245 and a time status data field 255 that can be used to mark the state of the time (e.g., free, busy). The interface 200 can further include an additional reminder data field 230, enabling the user to add a reminder for the appointment. The interface 200 can further include a time data field 240, an audible reminder option 250 and a time status data field 260 that can be used to mark the state of the time (e.g., free, busy). In exemplary embodiments, the additional reminder data field 230, the time data field 240, the audible reminder option 250 and the time status data field 260 can be made visible after the reminder data field 225 has been checked. If the reminder data field 225 has not been checked, then, in exemplary embodiments, the additional reminder data field 230, the time data field 240, the audible reminder option 250 and the time status data field 260 can be grayed out or not visible. In this way, the user can be given the option of additional reminders in response to the user choosing a first reminder. It is appreciated that additional data fields can be added to add third, fourth and additional reminders. Finally, the interface 200 can include a text data field 265 into which the user can enter text regarding the appointment.

In exemplary embodiments, the audible reminders associated with the audible reminder options 245, 250 can include a change in sound attributes to differentiate the reminders. In exemplary embodiments, the interface 200 can be associated with an algorithm that sets the sound attributes to the reminders. Alternatively, the user can set the sound attributes manually. In exemplary embodiments, the interface 200 can further be associated with an algorithm that automatically sets multiple reminders for am event. For example, if the user indicates that he/she wants to set multiple reminders for an appointment, the algorithm can set three evenly spaced reminders prior to the appointment (e.g., three days before the appointment, two days before the appointment, and one day before the appointment). In addition, default sound attributes can be set for each of the three reminders (e.g., increasing volume). As each reminder sounds, the user can acknowledge the reminder. Finally, on the day of the appointment, the user can acknowledge the appointment. In exemplary embodiments, if the user misses the appointment, the algorithm can reset defaults to generate additional reminders with more prominent sound attributes (e.g., increased volume). In exemplary embodiments, the user can manually change these attributes if the attributes are not suitable to the user. However, it is appreciated that the algorithm associated with the interface 200 as described above, can make adjustments based on the user having missed an appointment or habitually missing appointments.

FIG. 2 illustrates an exemplary embodiment of the interface 200 for setting multiple reminders for an appointment. In exemplary embodiments, as discussed above, the systems and methods described herein can also set multiple reminders for a task. FIG. 3 illustrates a screenshot of the multiple reminder task user interface 300 in accordance with exemplary embodiments. The interface 300 can include a "due" reminder field 305 indicating the count down until the task is due. The interface 300 can further include a subject data field 310. In exemplary embodiments, the interface 300 can further include conventional pull down menus 301. For example, the conventional pull down menus 301 can include an option to assign the task. In exemplary embodiments, the assign tasks option can include options to generate multiple reminders as discussed herein. In exemplary embodiments, the interface 300 can further include time options 315, including a due date data field and a start date data fiend, a status data field, a priority data field, and a data field indicating the percentage of the task that is complete.

In exemplary embodiments, the interface 300 can further include a reminder data field 320 such as a check box including a day data field 335 (i.e., to generate a reminder on the day indicated in the day data field 335), a time data field 355 (i.e., to generate a reminder at the time indicated in the time data field 355), and an audible reminder option 360. The interface 300 can further include an additional reminder data field 325, enabling the user to add a reminder for the task. The interface 300 can further include a day data field 340, a time data field 365 and an audible reminder option 370. In exemplary embodiments, the interface 300 can further include another reminder data field 330 (that is illustrated as unavailable), thereby enabling the user to generate another reminder for the task. The interface 300 can further include a day data field 345, a time data field 375 and an audible reminder option 380. Each of the respective reminder fields 320, 325, 330, can include a respective owner data field such as an owner data field 381. As mentioned above, in exemplary embodiments, the additional reminder data fields 325, 330, the day data fields 340, 345, the time data fields 365, 375, and the audible reminder options 370, 380 can be made visible after the reminder data field 320 has been checked. If the reminder data field 320 has not been checked, then, in exemplary embodiments, the additional reminder data fields 325, 330, the clay data fields 340, 345, the time data fields 365, 375, and the audible reminder options 370, 380 can be grayed out or not visible. In this way, the user can be given the option of additional reminders in response to the user choosing a first reminder. It is appreciated that additional data fields can be added to add fourth, fifth and additional reminders. In exemplary embodiments, the interface 300 can include a text data field 385 into which the user can enter text regarding the appointment. Finally, the interface 300 can further include addition options such as a contacts data field 390, a categories data field 395, and an indicator 386 (e.g., a check box) to select to make the task private. In exemplary embodiments, the designation of the owner of an event on the reminders can be set. As such, multiple owners can be assigned to a given task and reminder.

In exemplary embodiments, the audible reminders associated with the audible reminder options 360, 370, 380 can include a change in sound attributes to differentiate the reminders. In exemplary embodiments, the interface 300 can be associated with an algorithm that sets the sound attributes to the reminders. Alternatively, the user can set the sound attributes manually. In exemplary embodiments, the interface 300 can further be associated with an algorithm that automatically sets multiple reminders for an event. For example, if the user indicates that he/she wants to set multiple reminders for a task, the algorithm can set three evenly spaced reminders prior to the appointment (e.g., three days before the task, two days before the task, one day before the task). In addition, default sound attributes can be set for each of the three reminders (e.g., increasing volume). As each reminder sounds, the user can acknowledge the reminder. Finally, on the day of the task, the user can acknowledge the task. In exemplary embodiments, if the user has not completed the task, the algorithm can reset defaults to generate additional reminders with more prominent sound attributes (e.g., increased volume). In exemplary embodiments, the user can manually change these attributes if the attributes are not suitable to the user. However, it is appreciated that the algorithm associated with the interface 300 as described above, can make adjustments based on the user having not completed the task.

FIG. 4 illustrates a screenshot of the multiple reminder task user interface 400 in accordance with exemplary embodiments. The interface 400 illustrates an additional data field 405 associated with each of the reminder data fields 420, 425, 430. The data field 405 can include a number of icons 410, 415, 420, 425 each representing a preferred mode of contact for the reminder. For example, a preferred mode of contact can include a computer (as indicated by the icon 410), a cellular phone (as indicated by the icon 415), a personal digital assistant (as indicated by the icon 420) and a television (as indicated by the icon 425). It is appreciated that the icons 410, 425, 420, 425 are shown by way of example and can include fewer or additional modes of contact. In exemplary embodiments, the user can add or remove icons associated with the preferred mode of contact. In exemplary embodiments, an algorithm associated with the interface 400 can map the reminders to the preferred mode of contact. In exemplary embodiments, the different reminders can be sent to different modes of contact. In exemplary embodiments, a given reminder can be sent to multiple modes of contact. It is appreciated that the algorithm associated with the interface 400 can be programmed to send any reminder to any mode of contact. In addition, it is appreciated that during certain time periods it is not preferable to receive a reminder on a particular mode of contact. For example, the user may know that the user does not want to receive a reminder on the cellular phone during a particular time period (e.g., a scheduled meeting). As such, the icon 415 associated with the cellular phone can be grayed out if the time period for a particular reminder overlaps with a previously scheduled meeting (i.e., as indicated in the user's appointments).

In exemplary embodiments, the user can create reminders based on frequency selection. As such, instead of selecting another reminder, reminder frequency timeframes can be set up). For example, when a user creates an event, the user can choose from a selected reminder timeframe set (e.g., from an additional data field, the user can choose "infrequent, frequent, or very frequent"). If the user selects "frequent", the user can customize "frequent" to mean that the user is alerted every day up until the event (or, every hour). After selecting a frequency, the interface 300, 400 can still display a list of the reminders, so that the user can adjust the reminder times.

Figure 5:
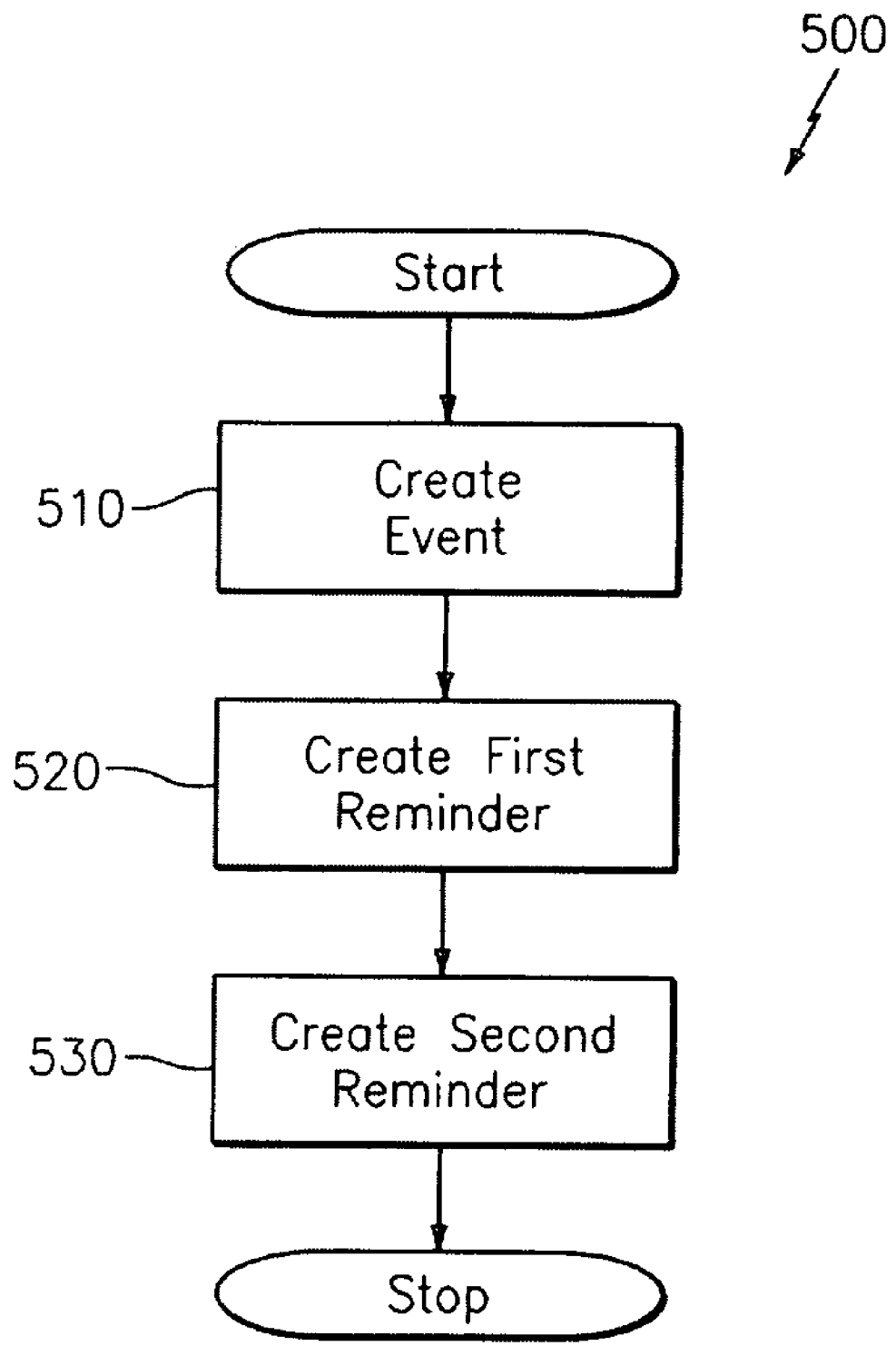
FIG. 5 illustrates a flowchart of a method for providing multiple reminders for calendar events in accordance with exemplary embodiments.

FIG. 5 illustrates a flowchart of a method 500 for providing multiple reminders for calendar events in accordance with exemplary embodiments. At block 510, the user can create an event having an event time in a calendar application (e.g., the calendar user applications 115, 120). As discussed above, the event can be an appointment or a task. At block 520, the user can create a first reminder associated with the event and configured to activate at a first time prior to the event. At block 530, the user can then create an additional reminder associated with the event and configured to activate at a second time prior to the event and after the first time. As further discussed above, each of the reminders can include a set of attributes that differ from one another in order to differentiate the reminder. In exemplary embodiments, the sound attributes can include volume, frequency and timbre (e.g., different tones). For example, a first reminder can include the same tone as the second reminder, but the second reminder can have a greater volume. In exemplary embodiments, it is appreciated that the second reminder is closer to the appointment of task than the first reminder. Although FIG. 5 only shows the creation of two reminders, it should be appreciated that any number of reminders may be generated.

In exemplary embodiments, the systems and methods described herein can be implemented to set multiple reminders for events that have multiple tasks, or a main task having multiple sub-events. It is appreciated that certain events can have bundles of sub-events or activities related to such events (e.g., weddings, funerals, prom, ballgame, start of school). For example, in planning a wedding there are many tasks that must be accomplished before the wedding day (e.g., reserving a church, reserving a reception, hiring a photographer). As such, in exemplary embodiments, multiple reminders can be assigned to multiple tasks. In exemplary embodiments, each unique task can include a unique sound and sound attribute such that the user can audibly identify which reminder is generated for which task. For example, in the above wedding example, a bell can chime for a reminder associated with reserving a church, a crowd noise can sound for a reminder associated with reserving a reception hall, and a shutter click can sound for a reminder associated with hiring a photographer.

In exemplary embodiments, calendaring software (e.g., the calendar user application 115, 120 in conjunction with the multiple reminder application 125, 130) may include prepackaged events. For example, in exemplary embodiments, a user can select a "Wedding" event. In response to the user selecting the "Wedding" event, multiple sub-events for wedding, such as described those above, are created on the user's calendar. Each of these sub-events may also have reminders or multiple reminders associated with them, which can be set by default and can be manually adjusted by the user. In exemplary embodiments, the user may preview the sub-events and adjust the time frames for the sub-events, or may adjust the timeframes for the reminders for the sub-events.

Figure 6:
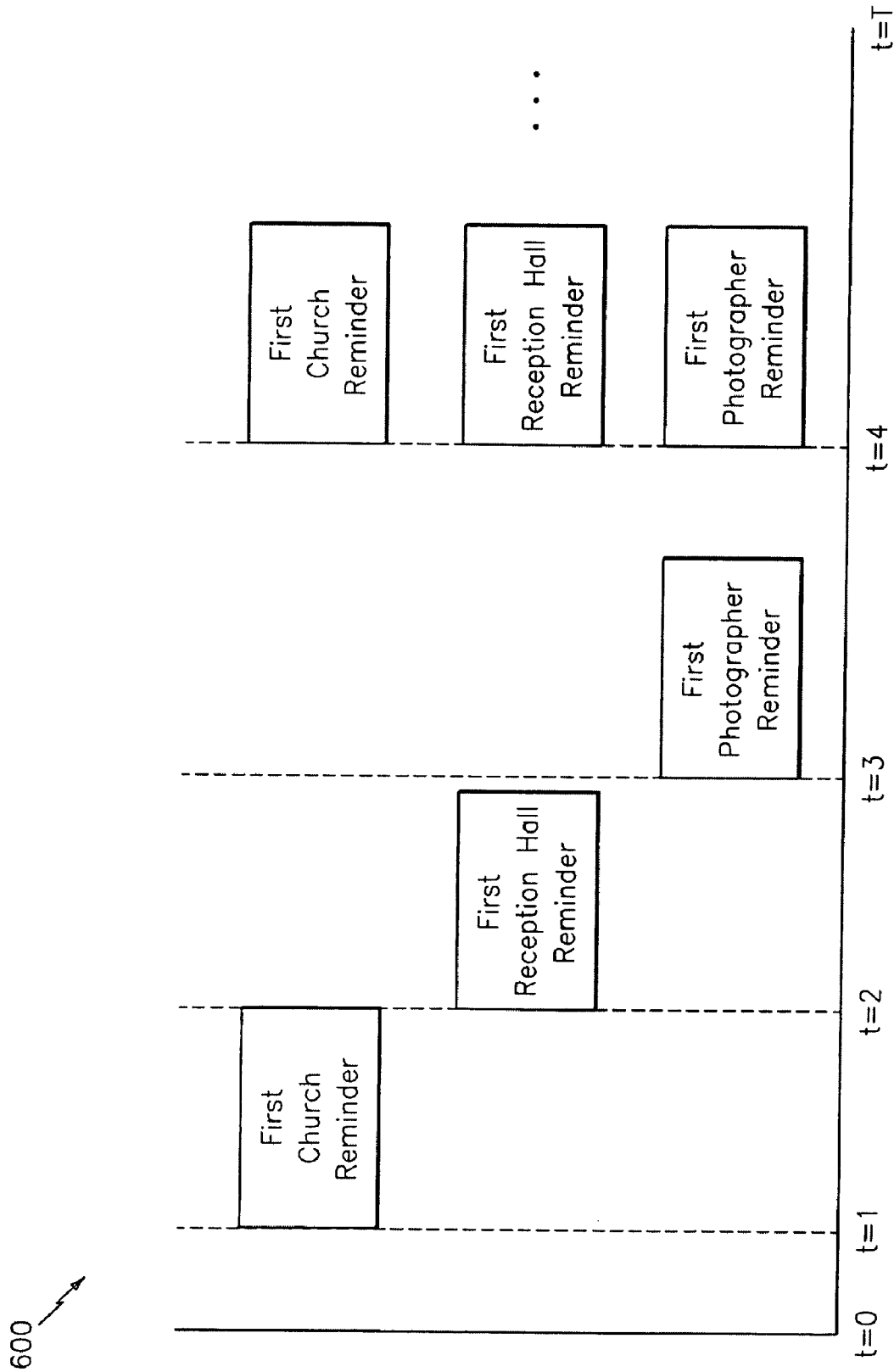
FIG. 6 illustrates an example of a timeline for an event having multiple sub-events and multiple reminders in accordance with exemplary embodiments.

FIG. 6 illustrates an example of a timeline 600 for an event having multiple sub-events and multiple reminders in accordance with exemplary embodiments. It is appreciated that the timeline 600, the selected times, the selected event (i.e., a wedding), and the selected sub-events (i.e., reserving a church, reserving a reception hall, hiring a photographer) are shown and discussed only for illustrative purposes. It is appreciated that many events, sub-events and timelines are contemplated in exemplary embodiments.

Referring still to FIG. 6 a time t=0 is selected as a start date and a time t=T is selected as the wedding day. A first time is set by the calendaring software at t=1 to generate a reminder that the user needs to select a church. The first reminder at t=1 may indicate that the user must at least place phone calls in order to reserve a church. As discussed above, the sound (e.g., a wave file) that is generated is a church bell at a first volume. A second time is set by the calendaring software at t=2 to generate a reminder that the user needs to select a reception hall. The second reminder at t=2 may indicate that the user must at least place phone calls in order to reserve a reception hall. As discussed above, the sound that is generated can be a crowd noise at a first volume. A third time is set by the calendaring software at t=3 to generate a reminder that the user needs to hire a photographer. The third reminder at t=3 may indicate that the user must at least place phone calls in order to hire a photographer. As discussed above, the sound that is generated can be a camera click at a first volume. A fourth time is set by the calendaring software at t=4 to generate a reminder that the user needs to perform all three sub-events, that is, to reserve a church, to reserve a reception hall and to hire a photographer. The fourth reminder at t=4 may indicate that the user must have at least identified multiple options for the church, reception hall and the photographer, and have at least one appointment for each. The sounds generated for each of the sub-events can, respectively, include the church bell, the crowd noise and the camera click at second volumes (or different sound attributes). In exemplary embodiments, when t=4 occurs, the sounds may be generated in series or at different specified times, which may be set by default by the calendaring software. In further exemplary embodiments, since the sub-events all occur at t=4, a unique single sound may be generated indicating that multiple events are occurring at the same time. In this way, the user is not overwhelmed by multiple sounds at one time, but is also given a unique sound that indicates a sense of urgency associated with the need to address multiple sub-events.

In exemplary embodiments, it is appreciated that a user can also create his/her packaged event (may be work-flow related). In exemplary embodiments, pre-packaged events may be sold on the Internet. Each sub-event may include the contact number for a particular vendor or store associated with the sub-event. An advertisement can appear, and the user can click on the advertisement to make a purchase. The vendor or the store pays money to be associated with the sub-event. For example, in the case of a wedding, links may be available for churches, reception halls and photographers in the immediate area. In exemplary embodiments, advertisement links can be "pulled" from social networking sites, or queries can be run to determine the most popular vendors/locations (e.g., for photography 75% of people ages 20-30 use John Smith). It is appreciated that in other exemplary embodiments, other pre-packaged events such as funerals, birthdays, proms, start of school and other events that have timelines for sub-events can be included as described above. It is further appreciated that the pre-packaged events can be included with the calendar applications, or can alternatively be included as separate applications.

Figure 7:
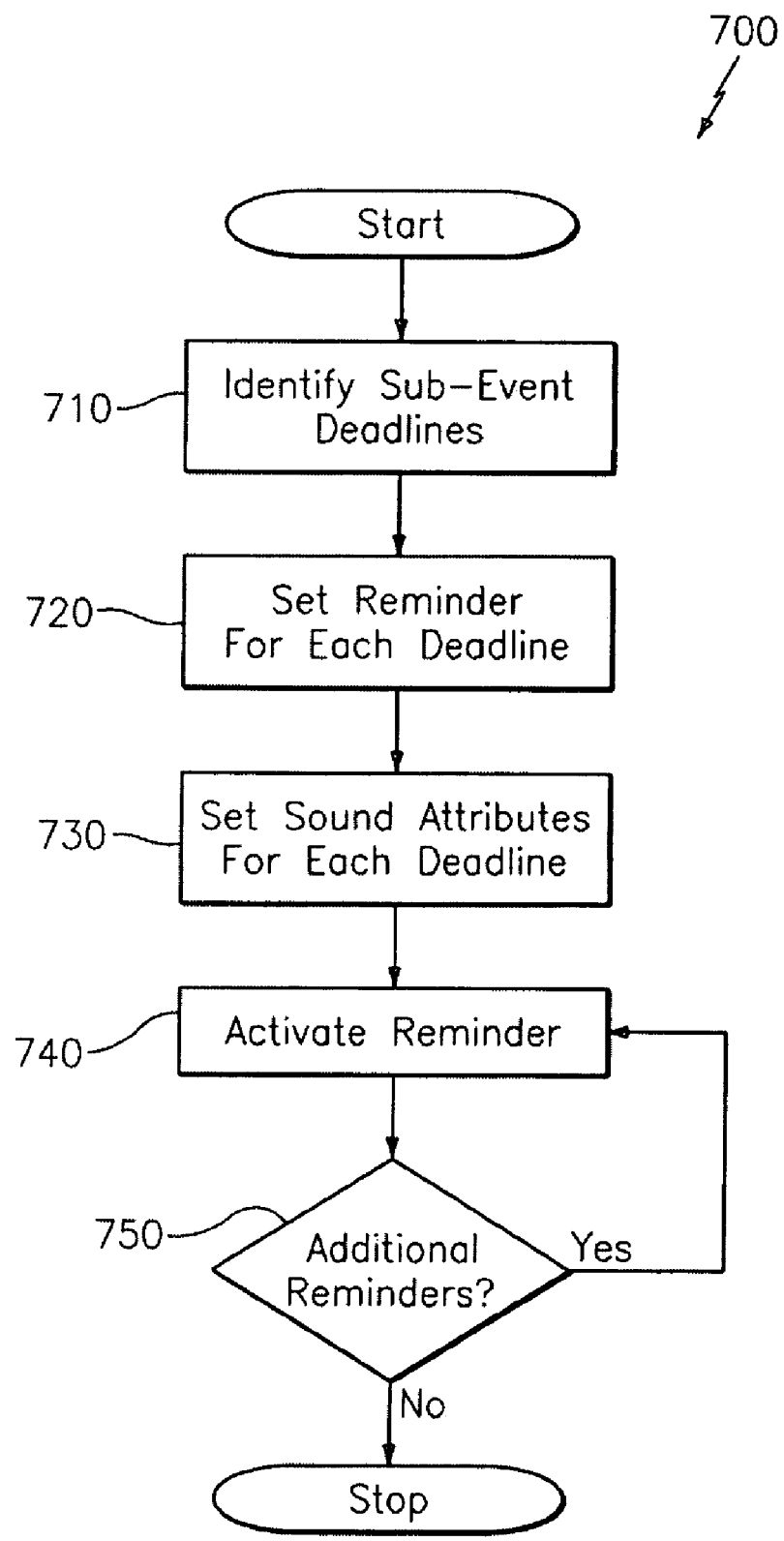
FIG. 7 illustrates a flowchart for a method for providing multiple reminders for calendar events having multiple sub-events in accordance with exemplary embodiments.

FIG. 7 illustrates a flowchart for a method 700 for providing multiple reminders for calendar events having multiple sub-events in accordance with exemplary embodiments. At block 710, the user can first identify the deadlines associated with the sub-events. At block 720, the user can set a reminder for each of the deadlines associated with the sub-events. At 730, the user can further set a sound attribute for each of the reminders for each of the deadlines associated with the sub-events. At block 740, each reminder is activated for a given deadline. It is appreciated that the activation of deadlines at block 740 can occur over a time period (e.g., several months for a wedding). As such, at block 750, the method 700 determines if there are additional reminders. If there are additional reminders, then the method 700 continues at block 740. However, it is appreciated in exemplary embodiments, that block 740 only activates at the time of the next reminder. It is further appreciated that, in exemplary embodiments, each of the reminders can different in sound attributes as discussed above (e.g., a bell chime for a church reservation reminder). Furthermore, in exemplary embodiments, that a unique sound attribute different from any one of the reminders can activate if multiple reminders overlap, thereby alerting the user that there are multiple reminders bundles into a single reminder.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for generating multiple reminders in an electronic calendar, the method comprising:
    creating an event having an event time in the electronic calendar;
    creating a first reminder associated with the event and configured to activate at a first time prior to the event; and
    concurrently creating at least one additional reminder associated with the event and configured to activate at a second time prior to the event and after the first time;
    wherein when the first reminder is created, a selectable button is displayed on a communication device;
    wherein the selectable button displayed on the communication device is configured for creating the at least one additional reminder; and
    wherein the selectable button was not previously selectable before creating the first reminder.

2. The method as claimed in claim 1 wherein the first reminder includes a first set of sound attributes.

3. The method as claimed in claim 2 wherein the at least one additional reminder has a second set of sound attributes.

4. The method as claimed in claim 3 wherein the first and second sets of sound attributes include volume, frequency and timbre.

5. The method as claimed in claim 4 wherein the first set of sound attributes is different from the second set of sound attributes;
    wherein the second set of sound attributes has a louder volume than the first set of sound attributes; and
    wherein a third set of sound attributes has a louder volume than the second set of sound attributes, the third set of sound attributes correspond to a third reminder.

6. The method as claimed in claim 1 wherein the event includes at least one of an appointment and a task.

7. The method as claimed in claim 1 wherein the second time is temporally closer to the event time than the first time; and
    wherein an algorithm of the communication device automatically: creates the first reminder for the event, automatically creates the at least one reminder for the event, and automatically creates a last reminder for the event.

8. A computer program product for generating multiple reminders in an electronic calendar, the computer program product including instructions for causing a computer to implement a method, comprising:
    creating an event having an event time in the electronic calendar;
    creating a first reminder associated with the event and configured to activate at a first time prior to the event; and
    concurrently creating at least one additional reminder associated with the event and configured to activate at a second time prior to the event and after the first time;
    wherein when the first reminder is created, a selectable button is displayed on a communication device;
    wherein the selectable button displayed on the communication device is configured for creating the at least one additional reminder; and
    wherein the selectable button was not previously selectable before creating the first reminder.

9. The computer program product as claimed in claim 8 wherein the first reminder includes a first set of sound attributes.

10. The computer program product as claimed in claim 9 wherein the at least one additional reminder has a second set of sound attributes.

11. The computer program product as claimed in claim 10 wherein the first and second set of sound attributes includes at least one of volume, frequency and timbre.

12. The computer program product as claimed in claim 11 wherein the first set of sound attributes is different from the second set of sound attributes.

13. The computer program product as claimed in claim 8 wherein the event includes at least one of an appointment and a task.

14. The computer program product as claimed in claim 8 wherein the second time is temporally closer to the event time than first time.

15. A system for generating multiple reminders in an electronic calendar, the system comprising:
    a user interface configured to receive appointments and reminders from the electronic calendar; and
    a computer supporting the user interface and configured to generate multiple reminders associated with the electronic calendar that includes instructions to:
    create an event having an event time in the electronic calendar,
    create a first reminder associated with the event and configured to activate at a first time prior to the event, and
    concurrently create at least one additional reminder associated with the event and configured to activate at a second time prior to the event and after the first time;
    wherein when the first reminder is created, a selectable button is displayed on the computer;
    wherein the selectable button displayed on the computer is configured for creating the at least one additional reminder; and
    wherein the selectable button was not previously selectable before creating the first reminder.

16. The system as claimed in claim 15 wherein the first reminder includes a first set of sound attributes.

17. The system as claimed in claim 16 wherein the at least one additional reminder has a second set of sound attributes.

18. The system as claimed in claim 17 wherein the first and second set of sound attributes includes at least one of volume, frequency and timbre.

19. The system as claimed in claim 18 wherein the first set of sound attributes is different from the second set of sound attributes.

20. The system as claimed in claim 15 wherein the event includes at least one of an appointment and a task.

* * * * *